(12) United States Patent
Chen

(10) Patent No.: US 7,463,676 B2
(45) Date of Patent: Dec. 9, 2008

(54) ON-LINE PHASE NOISE MEASUREMENT FOR LAYERED MODULATION

(75) Inventor: Ernest C. Chen, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 683 days.

(21) Appl. No.: 10/692,539

(22) Filed: Oct. 24, 2003

(65) Prior Publication Data

US 2004/0091033 A1    May 13, 2004

Related U.S. Application Data

(60) Provisional application No. 60/421,291, filed on Oct. 25, 2002.

(51) Int. Cl.
 *H04Q 1/20* (2006.01)
 *H04B 17/00* (2006.01)

(52) U.S. Cl. .................... 375/222; 375/226

(58) Field of Classification Search ........... 375/226, 375/227, 224, 371, 222; 342/13; 455/318, 455/333; 702/111; 752/72; 324/613
See application file for complete search history.

(56) References Cited

U.S. PATENT DOCUMENTS

| | | | |
|---|---|---|---|
| 3,076,180 A | 1/1963 | Havens et al. |
| 3,383,598 A | 5/1968 | Sanders |
| 3,878,468 A | 4/1975 | Falconer et al. |
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,199,047 A | 4/1980 | Ling |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |

(Continued)

FOREIGN PATENT DOCUMENTS

DE    3642213    12/1986

(Continued)

OTHER PUBLICATIONS

Scott et al., Ultralow Phase Noise Ti:sapphire Laser Rivals 100 MHz Crystal Oscillator, Nov. 11-15, 2001, IEEE-Leos, pp. 1-2.*

(Continued)

*Primary Examiner*—Mohammed Ghayour
*Assistant Examiner*—Lawrence Williams

(57) ABSTRACT

A method and apparatus for measuring the phase noise of an low noise block (LNB) and other devices while the device under test is on line is disclosed. Using a signal processing procedure over a short duration of a received signal, the technique demodulates the signal to expose the phase history of the underlying carrier for measurement. In an exemplary apparatus timing and carrier recovery on A/D samples are performed conventionally, a linear phase is estimated from minimum mean square fitting to the recovered carrier phase history, the single tone carrier is removed from the recovered phase to yield a residual phase. A fast Fourier transform (FFT) can be performed on the residual phase to produce a phase noise spectral measurement at an input of the demodulator.

21 Claims, 14 Drawing Sheets

U.S. PATENT DOCUMENTS

| | | | |
|---|---|---|---|
| 4,416,015 A | 11/1983 | Gitlin | |
| 4,422,175 A | 12/1983 | Bingham et al. | |
| 4,484,337 A | 11/1984 | Leclert et al. | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A | 5/1989 | Borth et al. | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffatt et al. | |
| 5,043,734 A * | 8/1991 | Niho | 342/25 A |
| 5,088,110 A | 2/1992 | Bonnerot et al. | |
| 5,111,155 A | 5/1992 | Keate et al. | |
| 5,121,414 A | 6/1992 | Levine et al. | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A | 2/1994 | Chennakeshu et al. | |
| 5,317,599 A | 5/1994 | Obata | |
| 5,329,311 A | 7/1994 | Ward et al. | |
| 5,337,014 A | 8/1994 | Najle et al. | |
| 5,353,307 A | 10/1994 | Lester et al. | |
| 5,363,103 A * | 11/1994 | Inkol | 342/13 |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A | 11/1995 | Koslov | |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,592,481 A | 1/1997 | Wiedeman et al. | |
| 5,602,868 A | 2/1997 | Wilson | |
| 5,603,084 A | 2/1997 | Henry, Jr. et al. | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,644,592 A | 7/1997 | Divsalar et al. | |
| 5,648,955 A | 7/1997 | Jensen et al. | |
| 5,732,113 A | 3/1998 | Schmidl et al. | |
| 5,793,818 A | 8/1998 | Claydon et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,923,278 A * | 7/1999 | Poehler et al. | 342/25 C |
| 5,937,004 A | 8/1999 | Fasulo, II et al. | |
| 5,940,025 A | 8/1999 | Koehnke et al. | |
| 5,940,750 A | 8/1999 | Wang | |
| 5,946,625 A | 8/1999 | Hassan et al. | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A | 10/1999 | Hummelgaard et al. | |
| 5,970,429 A | 10/1999 | Martin | |
| 5,978,652 A | 11/1999 | Burr et al. | |
| 5,987,068 A | 11/1999 | Cassia et al. | |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A * | 6/2000 | Rahnema | 375/325 |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,125,260 A | 9/2000 | Wiedeman et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 | 2/2001 | Aman et al. | |
| 6,212,360 B1 | 4/2001 | Fleming, III et al. | |
| 6,219,095 B1 | 4/2001 | Zhang et al. | |
| 6,246,717 B1 * | 6/2001 | Chen et al. | 375/226 |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |
| 6,314,441 B1 | 11/2001 | Raghunath | |
| 6,320,464 B1 | 11/2001 | Suzuki et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,335,951 B1 | 1/2002 | Cangiani et al. | |
| 6,366,309 B1 | 4/2002 | Siegle | |
| 6,369,648 B1 | 4/2002 | Kirkman | |
| 6,377,116 B1 | 4/2002 | Mattsson et al. | |
| 6,389,002 B1 | 5/2002 | Schilling | |
| 6,411,659 B1 | 6/2002 | Liu et al. | |
| 6,411,797 B1 | 6/2002 | Estinto | |
| 6,426,822 B1 | 7/2002 | Winter et al. | |
| 6,429,740 B1 | 8/2002 | Nguyen et al. | |
| 6,433,835 B1 | 8/2002 | Hartson et al. | |
| 6,452,977 B1 | 9/2002 | Goldston et al. | |
| 6,477,398 B1 | 11/2002 | Mills | |
| 6,501,804 B1 | 12/2002 | Dietmar et al. | |

| | | | |
|---|---|---|---|
| 6,515,713 B1 | 2/2003 | Nam | |
| 6,522,683 B1 | 2/2003 | Smee et al. | |
| 6,529,715 B1 | 3/2003 | Kitko et al. | |
| 6,535,497 B1 | 3/2003 | Raith | |
| 6,535,801 B1 | 3/2003 | Geier et al. | |
| 6,574,235 B1 | 6/2003 | Arslan et al. | |
| 6,597,750 B1 | 7/2003 | Knutson et al. | |
| 6,657,978 B1 | 12/2003 | Millman | |
| 6,661,761 B2 | 12/2003 | Hayami et al. | |
| 6,678,336 B1 | 1/2004 | Katoh et al. | |
| 6,700,442 B2 | 3/2004 | Ha | |
| 6,718,184 B1 | 4/2004 | Aiken et al. | |
| 6,731,622 B1 | 5/2004 | Frank et al. | |
| 6,731,700 B1 | 5/2004 | Yakhnich et al. | |
| 6,745,050 B1 | 6/2004 | Forsythe et al. | |
| 6,754,872 B2 | 6/2004 | Zhang et al. | |
| 6,772,182 B1* | 8/2004 | McDonald et al. | 708/321 |
| 6,775,521 B1 | 8/2004 | Chen | |
| 6,795,496 B1* | 9/2004 | Soma et al. | 375/226 |
| 6,809,587 B2 | 10/2004 | Boutouili et al. | |
| 6,892,068 B2 | 5/2005 | Karabinis et al. | |
| 6,898,762 B2 | 5/2005 | Ellis et al. | |
| 6,922,436 B1 | 7/2005 | Porat et al. | |
| 6,922,439 B2* | 7/2005 | Yamaguchi et al. | 375/226 |
| 6,934,314 B2 | 8/2005 | Harles et al. | |
| 6,947,741 B2 | 9/2005 | Beech et al. | |
| 6,956,841 B1 | 10/2005 | Stahle et al. | |
| 6,956,924 B2 | 10/2005 | Linsky et al. | |
| 6,970,496 B1 | 11/2005 | Ben-Bassat et al. | |
| 6,980,609 B1 | 12/2005 | Ahn | |
| 6,990,627 B2 | 1/2006 | Uesugi et al. | |
| 6,999,510 B2 | 2/2006 | Batruni | |
| 7,035,324 B2* | 4/2006 | Mar et al. | 375/224 |
| 7,041,406 B2 | 5/2006 | Schuler et al. | |
| 7,073,116 B1 | 7/2006 | Settle et al. | |
| 7,079,585 B1 | 7/2006 | Settle et al. | |
| 7,154,958 B2 | 12/2006 | Dabak et al. | |
| 7,161,931 B1 | 1/2007 | Li et al. | |
| 7,173,981 B1 | 2/2007 | Chen et al. | |
| 7,209,524 B2 | 4/2007 | Chen | |
| 7,230,992 B2 | 6/2007 | Walker et al. | |
| 7,239,876 B2 | 7/2007 | Johnson et al. | |
| 7,251,291 B1 | 7/2007 | Dubuc et al. | |
| 7,263,119 B1 | 8/2007 | Hsu et al. | |
| 2001/0012322 A1 | 8/2001 | Nagaoka et al. | |
| 2001/0016926 A1 | 8/2001 | Riggle | |
| 2001/0024479 A1 | 9/2001 | Samarasooriya | |
| 2001/0055295 A1 | 12/2001 | Akiyama et al. | |
| 2002/0006795 A1 | 1/2002 | Norin et al. | |
| 2002/0009141 A1 | 1/2002 | Yamaguchi et al. | |
| 2002/0051435 A1 | 5/2002 | Giallorenzi et al. | |
| 2002/0064244 A1* | 5/2002 | Berggren et al. | 375/346 |
| 2002/0071506 A1 | 6/2002 | Lindquist et al. | |
| 2002/0075951 A1* | 6/2002 | Pearson | 375/226 |
| 2002/0082792 A1 | 6/2002 | Bourde et al. | |
| 2002/0136327 A1 | 9/2002 | El-Gamal et al. | |
| 2002/0158619 A1 | 10/2002 | Chen | |
| 2002/0172296 A1 | 11/2002 | Pilcher | |
| 2002/0176516 A1 | 11/2002 | Jeske et al. | |
| 2002/0186761 A1 | 12/2002 | Corbaton et al. | |
| 2003/0002471 A1 | 1/2003 | Crawford et al. | |
| 2003/0031284 A1* | 2/2003 | Ishida et al. | 375/371 |
| 2003/0043941 A1 | 3/2003 | Johnson et al. | |
| 2003/0072385 A1 | 4/2003 | Dragonetti | |
| 2003/0138037 A1 | 7/2003 | Kaku et al. | |
| 2003/0138040 A1 | 7/2003 | Rouphael et al. | |
| 2003/0147472 A1 | 8/2003 | Bach et al. | |
| 2003/0171102 A1 | 9/2003 | Yang | |
| 2003/0185310 A1 | 10/2003 | Ketchum et al. | |
| 2003/0194022 A1 | 10/2003 | Hammons et al. | |
| 2004/0013084 A1 | 1/2004 | Thomas et al. | |
| 2004/0091059 A1 | 5/2004 | Chen | |
| 2004/0110467 A1 | 6/2004 | Wang | |
| 2004/0137863 A1 | 7/2004 | Walton et al. | |
| 2004/0146014 A1 | 7/2004 | Hammons et al. | |
| 2004/0146296 A1 | 7/2004 | Gerszberg et al. | |
| 2004/0196935 A1 | 10/2004 | Nieto | |
| 2005/0008100 A1 | 1/2005 | Chen | |
| 2005/0037724 A1 | 2/2005 | Walley et al. | |
| 2006/0013333 A1* | 1/2006 | Chen | 375/297 |
| 2006/0022747 A1 | 2/2006 | Chen et al. | |
| 2006/0045191 A1 | 3/2006 | Vasanath et al. | |
| 2006/0056541 A1 | 3/2006 | Chen et al. | |
| 2006/0153315 A1* | 7/2006 | Chen et al. | 375/295 |
| 2007/0121718 A1 | 5/2007 | Wang et al. | |

FOREIGN PATENT DOCUMENTS

| | | |
|---|---|---|
| DE | 03139027 | 6/1991 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1065854 | 1/2001 |
| EP | 1335512 | 8/2003 |
| FR | 2696295 | 4/1994 |
| FR | 2724522 | 3/1996 |
| JP | 2-005631 | 1/1990 |
| JP | 2-095033 | 4/1990 |
| JP | 5-041683 | 2/1993 |
| JP | 5-114878 | 5/1993 |
| JP | 5-252084 | 9/1993 |
| JP | 07-038615 | 2/1995 |
| JP | 2000-022659 | 1/2000 |
| JP | 2001-244832 | 9/2001 |
| JP | 2002118611 | 4/2002 |
| JP | 2002-300132 | 10/2002 |
| KR | 2001 0019997 | 3/2001 |
| WO | WO 99/00957 | 1/1999 |
| WO | WO 99/20001 | 4/1999 |
| WO | WO 99/23718 | 5/1999 |
| WO | WO 99/33203 | 7/1999 |
| WO | WO 01/13532 | 2/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 2005/074171 | 8/2005 |
| WO | WO 2005/086444 | 9/2005 |

OTHER PUBLICATIONS

Palicot, J., Veillard, J.; "Possible Coding and Modulation Approaches to Improve Service Availablility for Digital HDTV Satellite Broadcasting at 22 GHz"; IEEE Transactions on Consumer Electronics; vol. 39, Issue 3; Aug. 1993; pp. 660-667.

The Authoritive Dictionary of IEEE Standards Terms; Seventh Edition, pp. 1047 - definition of "signal"; 2000.

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

Janssen, G.J.M.; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio System", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998 (Nov. 5, 1998), pp. 543-546, XP010314962 ISBN: 0-7803-5106-1.

Saleh, A.A.M. et al.: "Adaptive Linearization of Pwer Amplifiers in Digital Radio Systems", Bell System Technical Journal, American Telephone and Telegraph Co., New York, US, vol. 62, No. 4, Part 1, Apr. 1, 1983 (1983-04-2001), pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Meyr, Heinrich et al.; "Digital Communication Receivers - Synchronization, Channel Estimation, and Signal Processing"; John Wiley & Sons, Inc.; 1998; pp. 212-213 and 217-218; XP 002364874.

Meyr, Heinrich et al.; "Digital Communications Receivers - Synchronization, Channel Estimation, and Signal Processing"; John Wiley & Sons, Inc.; 1998; pp. 610-612; XP 002364876.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

Non-final Office Action dated Dec. 27, 2007 in U.S. Appl. No. 10/519,375 filed Dec. 22, 2004 by Ernest Chen.

Non-final Office Action dated Dec. 11, 2007 in U.S. Appl. No. 10/913,927 filed Aug. 5, 2004 by Ernest Chen.

Non-final Office Action dated Nov. 15, 2007 in U.S. Appl. No. 11/619,173 filed Jan. 2, 2007 by Ernest Chen.

Non-final Office Action dated Nov. 19, 2007 in U.S. Appl. No. 10/532,631 filed Apr. 25, 2005 by Paul Anderson.

Non-final Office Action dated Nov. 16, 2007 in U.S. Appl. No. 10/691,032 filed Oct. 22, 2003 by Weizheng Wang.

Notice of Allowance dated Dec. 11, 2007 in U.S. Appl. No. 10/519,322 filed Dec. 23, 2004 by Ernest Chen.

Notice of Allowance dated Jan. 02, 2008 in U.S. Appl. No. 11/603,776 filed Nov. 22, 2006 by Ernest Chen.

Notice of Allowance dated Jan. 7, 2008 in U.S. Appl. No. 10/532,632 filed Apr. 25, 2005 by Ernest Chen.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3, pp. 1070-1074; XP010532692I ISBN: 0-7803-6596-8.

Non-final Office Action dated Mar. 3, 2008 in U.S. Appl. No. 11/656,662 filed Jan. 22, 2007 by Ernest C. Chen et al.

Non-Final Office Action dated Jun. 17, 2008 in U.S. Appl. No. 10/913,927 filed Aug. 5, 2004 by Ernest C. Chen.

Final Rejection dated Jun. 24, 2008 in U.S. Appl No 10/519,375 filed Dec. 22, 2004 by Ernest C. Chen et al.

Notice of Allowance dated Jun. 13, 2008 in U.S. Appl. No. 10/532,524 filed Apr. 25, 2005 by Ernest C. Chen.

European Search Report and Search Opinion dated Jun. 13, 2008 in European counterpart Application No. 07075745.5 corresponding to U.S. Appl. No. 09/844,401 filed Apr. 27, 2001 by Ernest C. Chen, now issued Apr. 24, 2007 as U.S. Pat. No. 7,209,524.

El-Gamal, Abbas and Cover, Thomas M.; "Mulitple User Information Theory"; Proceedings of IEEE; vol. 68, No. 12, Dec. 1980; pp. 1466-1483; XP007904837.

Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VCT; Ottawa, Canada; May 18-21, 1998; New York, New York, USA; vol. 3; May 18, 1998; pp. 1720-1724; XP010288123.

Non-final Office Action dated Apr. 30, 2008 in U.S. Appl. No. 10/962,346 filed Oct. 8, 2004 by Ernest C. Chen.

EPO Summons to attend Oral Proceedings dated Jul. 18, 2008 inm European counterpart Application No. 02728894.3 corresponding to U.S. Appl. No. 09/844,401 filed Apr. 27, 2001 by Ernest Chen, now issued Apr. 24, 2007 as U.S. Pat. No. 7,209,524.

Taiwanese Office Action dated May 14, 2008 in Taiwan counterpart Application No. 092129629 corresponding to U.S. Appl. No. 10/532,631 filed Apr. 25, 2005 by Paul R. Anderson et al.

Canadian Office Action dated Aug. 5, 2008 in Canadian counterpart Application No. 2503532 corresponding to U.S. Appl. No. 10/532,509 filed Oct. 17, 2003 by Ernest C. Chen et al., now issued Jun. 12, 2007 as U.S. Pat. No. 7,230,480.

Final Rejection dated Sep. 9, 2008 in U.S. Appl. No. 11/656,662 filed Jan. 22, 2007 by Ernest C. Chen et al.

Chinese Office Action dated Aug. 22, 2008 in Chinese Application No. 200410100591.6, referencing Chinese Patent CN1285984A (corresponding to EP0929164 )Societe Europeenne Des Satellites SA), which was cited by IDS on May 19, 2008).

* cited by examiner

ON-LINE PHASE NOISE MEASUREMENT FOR LAYERED MODULATION

CROSS-REFERENCE TO RELATED APPLICATIONS

This application claims the benefit under 35 U.S.C. §119 (e) of the following U.S. Provisional Patent Application, which is incorporated by reference herein:

Application Ser. No. 60/421,291, filed Oct. 25, 2002, by Ernest C. Chen, entitled "ON-LINE PHASE NOISE MEASUREMENT,"and is further related to the following applications:

Application Ser. No. 11/653,517, entitled "LAYERED MODULATION FOR DIGITAL SIGNALS," filed on Jan. 16, 2007, by Ernest C. Chen, which is a continuation of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/165,710, entitled "SATELLITE TWTA ON-LINE NON-LINEARITY MEASUREMENT," filed on Jun. 7, 2002, by Ernest C. Chen, which is a continuation-in-part of Application Ser. No. 09/844,401, entitled "LAYERED MODULATION FOR DIGITAL SIGNALS," filed on Apr. 27, 2001, by Ernest C, Chen, now is issued as U.S. Pat. No. 7,209,524;

Application Ser. No. 10/236,414, entitled "SIGNAL, INTERFERENCE AND NOISE POWER MEASUREMENT," filed on Sep. 6, 2002, by Ernest C. Chen and Chinh Tran, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/913,927, entitled "CARRIER TO NOISE RATIO ESTIMATIONS FROM A RECEIVED SIGNAL," filed on Aug. 5, 2004, by Ernest C. Chen, which is a continuation in part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. Number 11/619,173, entitled "PREPROCESSING SIGNAL LAYERS IN LAYERED MODULATION DIGITAL SIGNAL SYSTEM TO USE LEGACY RECEIVERS," filed Jan. 2, 2007, which is a continuation of Application Ser. No. 10/068,039, entitled "PREPROCESSING SIGNAL LAYERS IN LAYERED MODULATION DIGITAL SIGNAL SYSTEM TO USE LEGACY RECEIVERS," filed on Feb. 5, 2002, by Ernest C. Chen, Tiffany S. Furuya, Philip R. Hilmes, and Joseph Santoru now issued as U.S. Pat. No. 7,245,671, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,421, entitled "FAST ACQUISITION OF TIMING AND CARRIER FREQUENCY FROM RECEIVED SIGNAL," filed on Oct. 24, 2003, by Ernest C. Chen, now issued as U.S. Pat. No. 7,151,807, which claims priority to Provisional Patent Application Ser. No. 60/421,292, filed Oct. 25, 2002, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/692,491, entitled "ONLINE OUTPUT MULTIPLEXER FILTER MEASUREMENT," filed on Oct. 24, 2003, by Ernest C. Chen, which claims priority to Provisional Patent Application 60/421,290, filed Oct. 25, 2002, and which is a continuation-in-part of Application Ser. No. 09/844,401, entitled "LAYERED MODULATION FOR DIGITAL SIGNALS,"filed on Apr. 27, 2001, by Ernest C. Chen, now issued as U.S. Pat. No. 7,209,524;

Application Ser. No. 11/603,776, entitled "DUAL LAYER SIGNAL PROCESSING IN A LAYERED MODULATION DIGITAL SIGNAL SYSTEM," filed on Nov. 22, 2006, by Ernest C. Chen, Tiffany S. Furuya, Philip R. Hilmes, and Joseph Santoru, which is a continuation of Application Ser. No. 10/068,047, entitled "DUAL LAYER SIGNAL PROCESSING IN A LAYERED MODULATION DIGITAL SIGNAL SYSTEM," filed on Feb. 5, 2002, by Ernest C. Chen, Tiffany S. Furuya, Philip R. Hilmes, and Joseph Santoru, now issued as U.S. Pat. No. 7,173,981, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/691,032, entitled "UNBLIND EQUALIZER ARCHITECTURE FOR DIGITAL COMMUNICATION SYSTEMS," filed on Oct. 22, 2003, by Weizheng W. Wang, Tung-Sheng Lin, Ernest C. Chen, and William C. Lindsey, which claims priority to Provisional Patent Application Ser. No. 60/421,329, filed Oct. 25, 2002, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/962,346, entitled "COHERENT AVERAGING FOR MEASURING TRAVELING WAVE TUBE AMPLIFIER NONLINEARITY." filed on Oct. 8, 2004, by Ernest C. Chen, which claims priority to Provisional Patent Applicatbn Ser. No. 60/510,368, filed Oct. 10, 2003, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/655,001, entitled "AN OPTIMIZATION TECHNIQUE FOR LAYERED MODULATION," filed on Jan. 18, 2007, by Weizheng W. Wang, Guancai Zhou, Tung-Sheng Lin, Ernest C. Chen, Joseph Santoru, and William Lindsey, which claims priority to Provisional Patent Application 60/421,293, filed Oct. 25, 2002, and which is a continuation of Application Ser. No. 10/693,140, entitled "OPTIMIZATION TECHNIQUE FOR LAYERED MODULATION," filed on Oct. 24, 2003, by Weizheng W. Wang, Guancai Zhou, Tung-Sheng Lin, Ernest C. Chen, Joseph Santoru, and William Lindsey, now issued as U.S. Pat. No. 7,184,489, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524; Application Ser. No. 11/656,662, entitled "EQUALIZERS FOR LAYERED MODULATION AND OTHER SIGNALS," filed on Jan. 22, 2007, by Ernest C. Chen, Tung-Sheng Lin, Weizheng W. Wang, and William C. Lindsey, which claims priority to Provisional Patent Application 60/421,241, filed Oct. 25, 2002, and which is a continuation of Application Ser. No. 10/691,133, entitled "EQUALIZERS FOR LAYERED MODULATED AND OTHER SIGNALS," filed on Oct. 22, 2003, by Ernest C. Chen, Tung-Sheng Lin, Weizheng W. Wang, and William C. Lindsey, now issued as U.S. Pat. No. 7,184,473, which is a continuation-in-part of Application Ser. No. 09/844,401, entitled "LAYERED MODULATION FOR DIGITAL SIGNALS," filed on Apr. 27, 2001, by Ernest C. Chen, now issued as U.S Pat. No. 7,209,524;

Application Ser. No. 10/961,579, entitled "EQUALIZATION FOR TWTA NONLINEARITY MEASUREMENT" filed on Oct. 8, 2004, by Ernest C. Chen, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,632, entitled "LOWER COMPLEXITY LAYERED MODULATION SIGNAL PROCESSOR," filed on Apr. 25, 2005, by Ernest C. Chen, Weizheng W. Wang, Tung-Sheng Lin, Guangcai Zhou, and Joseph Santoru, which is a National Stage Application of PCT US03/32264, filed Oct. 10, 2003, which claims priority to Provisional Patent Application 60/421,331, entitled "LOWER COMPLEXITY LAYERED MODULATION SIGNAL PROCESSOR," filed Oct. 25, 2002, by Ernest C. Chen, Weizheng W. Wang, Tung-Sheng Lin, Guangcai Zhou, and Joseph Santoru, and which is a continuation-in-part of Application Ser. No. 09/844,401, entitled "MODULATION FOR DIGITAL SIGNALS," filed on Apr. 27, 2001, by Ernest C. Chen, now issued as U.S. Pat. No. 7,209,524;

Application Ser. No. 10/532,631, entitled "FEEDER LINK CONFIGURATIONS TO SUPPORT LAYERED MODULATION FOR DIGITAL SIGNALS," filed on Apr. 25, 2005, by Paul R. Anderson, Joseph Santoru and Ernest C. Chen, which is a National Phase Application of PCT US03/33255, filed Oct. 20, 2003, which claims priority to Provisional Patent Application 60/421,328, entitled "FEEDER LINK CONFIGURATIONS TO SUPPORT LAYERED MODULATION FOR DIGITAL SIGNALS," filed Oct. 25, 2002, by Paul R. Anderson, Joseph Santoru and Ernest C. Chen, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,619, entitled "MAXIMIZING POWER AND SPECTRAL EFFICIENCIES FOR LAYERED AND CONVENTIONAL MODULATIONS," filed on Apr. 25, 2005, by Ernest C. Chen, which is a National Phase Application of PCT Application US03/32800, filed Oct. 16, 2003, which claims priority to Provisional Patent Application 60/421,288, entitled "MAXIMIZING POWER AND SPECTRAL EFFICIENCIES FOR LAYERED AND CONVENTIONAL MODULATION," filed Oct. 25, 2002, by Ernest C. Chen and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, Application Ser. No. 10/532,524, entitled "AMPLITUDE AND PHASE MATCHING FOR LAYERED MODULATION RECEPTION," filed on Apr. 25, 2005, by Ernest C. Chen, Jeng-Hong Chen, Kenneth Shum, and Joungheon Oh, which is a National Phase Application of PCT Application US03/31199, filed Oct. 3, 2003, which claims priority to Provisional Patent Application 60/421,332, entitled "AMPLITUDE AND PHASE MATCHING FOR LAYERED MODULATION RECEPTION," filed Oct. 25, 2002, by Ernest C. Chen,Jeng-Hong Chen, Kenneth Shum, and Joungheon Oh, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, and also claims priority to;

Application Ser. No. 10/532,582, entitled "METHOD AND APPARATUS FOR TAILORING CARRIER POWER REQUIREMENTS ACCORDING TO AVAILABILITY IN LAYERED MODULATION SYSTEMS," filed on Apr. 25, 2005, by Ernest C. Chen, Paul R. Anderson and Joseph Santoru, now issued as U.S. Pat. No. 7,173,977, which is a National Stage Application of PCT Application US03/32751, filed Oct. 15, 2003, which claims priority to Provisional Patent Application 60/421,333, entitled "METHOD AND APPARATUS FOR TAILORING CARRIER POWER REQUIREMENTS ACCORDING TO AVAILABILITY IN LAYERED MODULATION SYSTEMS," filed Oct. 25, 2002, by Ernest C. Chen, Paul R. Anderson and Joseph Santoru, and which is a continuation-in-part of Applicatior Ser. No. 09/844,401, entitled "LAYERED MODULATION FOR DIGITAL SIGNALS ," filed on Apr. 27, 2001, by Ernest C. Chen, now issued as U.S. Pat. No. 7,209,524;

Application Ser. No. 10/532,509, entitled "ESTIMATING THE OPERATING POINT ON A NONLINEAR TRAVELING WAVE TUBE AMPLIFIER," filed on Apr. 25, 2005, by Ernest C. Chen and Shamik Maitra, now issued as U.S. Pat. No. 7,230,480, which is a National Stage Application of PCT Application US03/33130 filed Oct. 17, 2003, and which claims priority to Provisional Patent Application 60/421,289, entitled "ESTIMATING THE OPERATING POINT ON A NONLINEAR TRAVELING WAVE TUBE AMPLIFIER," filed Oct. 25, 2002, by Ernest C. Chen and Shamik Maitra, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,322, entitled "IMPROVING HIERARCHICAL 8PSK PERFORMANCE," filed on Dec. 23, 2004 by Ernest C. Chen and Joseph Santoru, which is a National Stage Application of PCT US03/020862 filed Jul. 1, 2003, which claims priority to Provisional Patent Application 60/392,861, filed Jul. 1, 2002 and Provisional Patent Application 60/392,860, filed Jul. 1, 2002, and which is also related to Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524; and Application Ser. No. 10/519,375, entitled "METHOD AND APPARATUS FOR LAYERED MODULATION," filed on Jul. 3, 2003, by Ernest C. Chen and Joseph Santori, which is a National Stage Application of PCT US03/20847, filed Jul. 3, 2003, which claims priority to Provisional Patent Application 60/393,437 filed Jul. 3, 2002, and which is related to Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524; and Application Ser. No. 10/693,135, entitled "LAYERED MODULATICN FOR TERRESTRIAL ATSC APPLICATIONS", filed on Oct. 24, 2003, by Ernest C. Chen, which claims priority to Provisional Patent Application 60/421,327 filed on Oct. 25, 2002, by Ernest C. Chen.

BACKGROUND OF THE INVENTION

1. Field of the Invention

The present invention relates to systems and methods for phase noise measurement in transmitted signals, particularly signals using layered modulations.

2. Description of the Related Art

Digital signal communication systems have been used in various fields, including digital TV signal transmission, either terrestrial or satellite. As the various digital signal communication systems and services evolve, there is a burgeoning demand for increased data throughput and added services.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, higher-order modulations typically have a greater sensitivity to the presence of phase noise.

Along the propagation path of a transmitted signal in a wireless system, a low noise block (LNB) provides a link between the wireless and landline environments, among its other functions. The LNB translates the radio frequency (RF) input frequency to an intermediate frequency (IF) output through a low-cost local oscillator. Consequently, the LNB is usually the dominant source of phase noise along the communication signal path. It is important that LNB phase noise not exceed the specification for the allowable total communication link noise to perform at the expected level. However, measurement of LNB phase noise has been an expensive proposition because of the wireless interface. In the implementation of digital broadcast systems, particularly using higher-order modulations, measurement of phase noise in the signal can be important in testing components and system function.

In a conventional method of measuring phase noise, the RF input of the LNB may require an anechoic chamber to perform an adequate phase noise measurement. Furthermore, such a measurement is usually accompanied with a time-consuming testing procedure over a range of operating input frequency of interest. The invented method calculates a phase noise spectrum with a single capture of a short received signal. The software that calculates the LNB phase noise is both simple and efficient.

Accordingly, there is a need for systems and methods that allow an on-line measurement of phase noise, particularly in digital television applications. Further, there is a need for such methods and apparatuses to be convenient and inexpensive to use. As detailed hereafter, the present invention meets these and other needs.

SUMMARY OF THE INVENTION

Embodiments of the present invention offer a low-cost replacement solution for measuring LNB phase noise, allowing LNBs to be tested more frequently and at convenient places. The result is increased assurance of overall system performance at a reduced cost.

A method to measure phase noise of an LNB and other devices while the device under test (DUT) is on line has been developed. Using a signal processing procedure over a short duration of a received signal, the method demodulates the signal to expose the phase history of the underlying carrier for measurement.

The conventional method of phase noise measurement has been to drive the LNB with a reference signal that has sufficiently good spectral purity. One difficulty with this method has been the lack of a convenient way to inject the required RF signal into the front end of the LNB, so that output from the LNB may be appropriately observed. Because of the wireless RF input, an anechoic chamber may be required. The invention provides a much less expensive way to measure LNB phase noise within the spectral region of significant impact. The method may be performed wherever a received signal can be captured and processed with the required signal processing.

A typical system for measuring phase noise according to the invention comprises a tuner 803 for tuning a signal from a device and converting the signal to a baseband signal and at least one analog-to-digital converter (ADC) 805 for capturing data from the baseband signal. A timing processor determines timing data from the captured data of the baseband signal and a carrier processor determines phase history data from the dining data in a conventional manner. Next, a line fitting processor determines a linear phase by fitting a straight line to the phase history data and a subtractor subtracts the linear phase from the phase history data to reveal the residual phase of the signal. The system can further employ a fast Fourier transform (FFT) processor for determining the phase noise spectrum from the residual phase from the subtractor and the phase noise spectrum can be scaled to dBc/KHz.

Typically, the line fitting processor can perform a minimum mean square (MMS) operation on the phase history data to determine the linear phase. The length of captured data can be based upon a lowest frequency of interest of the phase noise. More than one ADC can be used for example where the captured data comprises in-phase (I) and quadrature (Q) components.

The signal can comprise a satellite television signal. The signal can be received from a low noise block (LNB) downconverted in frequency for proper analog-to-digital conversion. Thus, the residual phase is substantially a performance measurement of the LNB.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

The present invention is directed to an on-line phase noise measurement method and apparatus. This method and apparatus is useful in a video distribution system using digital broadcast signals, particularly in a layered modulation signal system. Notably, the method and apparatus does not require that the device under test (DUT) be removed from operation in order to be tested; the phase noise measurement occurs while the system remains on line and processing a signal comprising actual payload data. An exemplary system architecture that can utilize the invention is detailed as follows.

2. Video Distribution System

Figure 1:
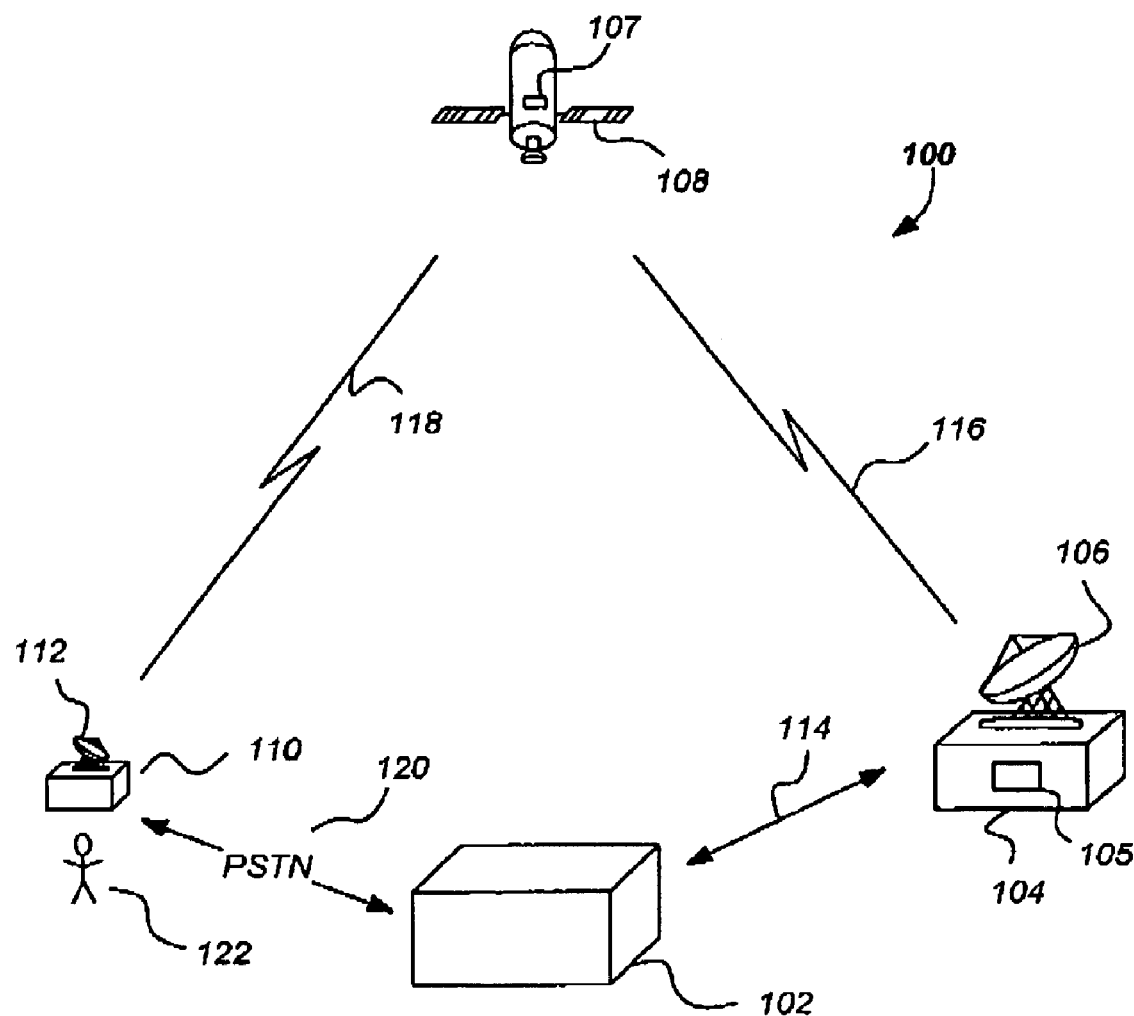
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via feeder link signal 116. The satellite 108 receives and processes this information, and transmits the video programs and control information to the subscriber receiver station 110 via downlink signal 118 using transmitter or transponder 107. The subscriber receiving station 110 receives this information using the outdoor unit (ODU) 112, which includes a subscriber antenna and a low noise block converter (LNB). The present invention is directed at testing of components of such a system for phase noise, particularly the LNB.

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to a system in which the program material delivered to the subscriber 122 is video (and audio) program material such as a movie, such a system can be used to deliver program material comprising purely audio information or other data as well.

2.1 Uplink Configuration

Figure 2:
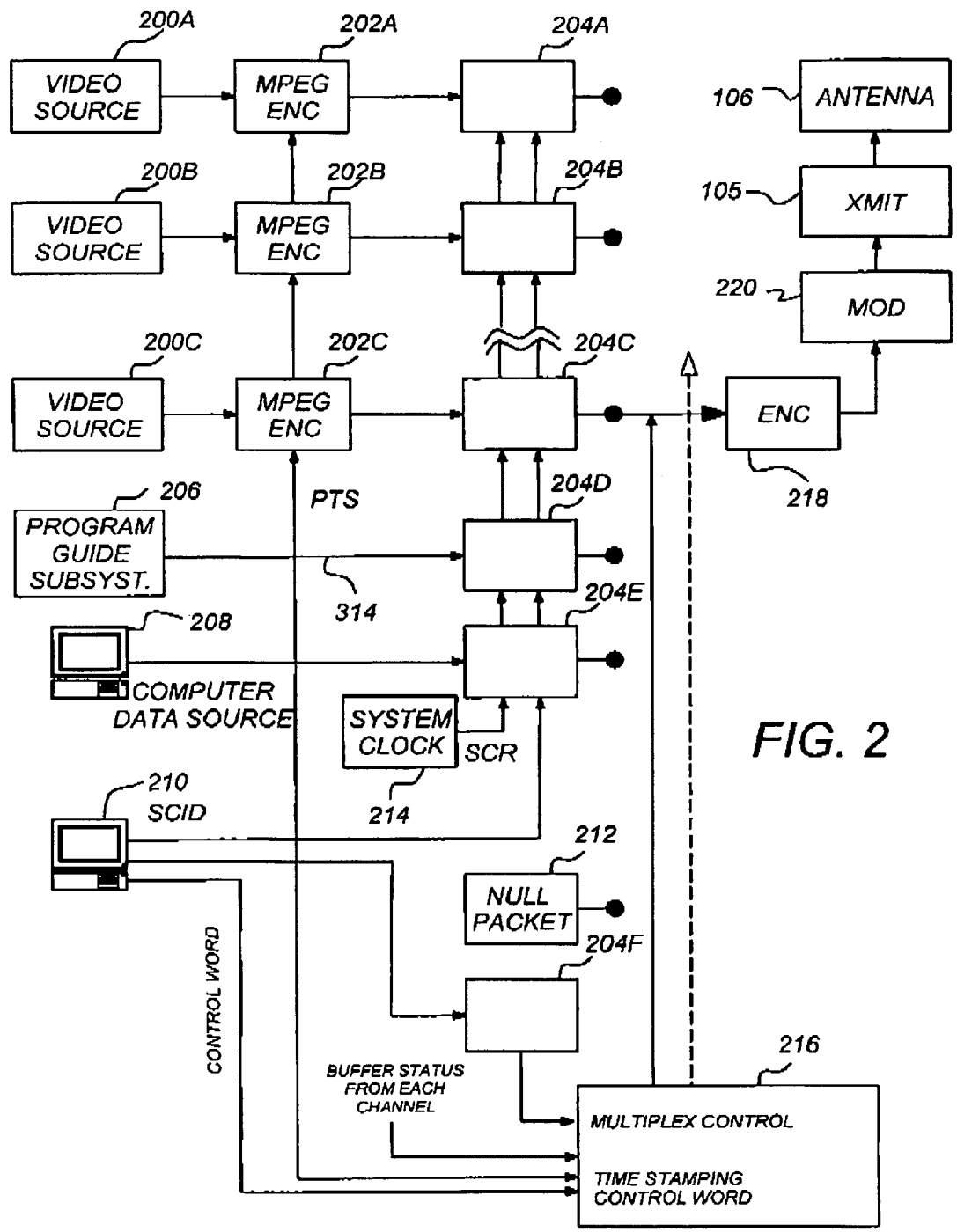
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which may be augmented respectively with one or more audio channels for high fidelity music, soundtrack information, or a secondary audio program for transmitting foreign languages), a data channel from a program guide subsystem 206 and computer data information from a computer data source 208.

Typical video channels are provided by a program source 200A-200C of video material (collectively referred to hereinafter as program source(s) 200). The data from each program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each program source 200.

The output data packets are assembled using a reference from the system clock 214 (SCR), and from the conditional access manager 210, which provides the service channel identifier (SCID) to the packetizers 204 for use in generating the data packets. These data packets are then multiplexed into serial data and transmitted.

2.2 Broadcast Data Stream Format and Protocol

Figure 3A:
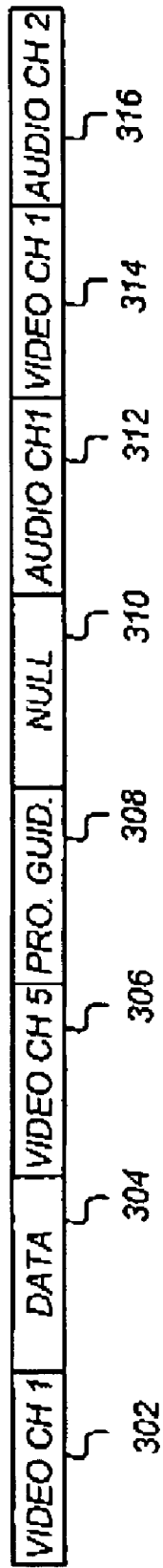
FIG. 3A is a diagram of a representative data stream.

FIG. 3A is a diagram of a representative data stream. The first packet 302 comprises information from video channel 1 (data coming from, for example, the first video program source 200A). The next packet 304 comprises computer data information that was obtained, for example from the computer data source 208. The next packet 306 comprises information from video channel 5 (from one of the video program sources 200). The next packet 308 comprises program guide information such as the information provided by the program guide subsystem 206. As shown in FIG. 3A, null packets 310 created by the null packet module 212 may be inserted into the data stream as desired followed by further data packets 312, 314, 316 from the program sources 200.

Referring back to FIG. 2, the data stream therefore comprises a series of packets (302-316) from any one of the data sources (e.g. program sources 200, program guide subsystem 206, computer data source 208) in an order determined by the controller 216. The data stream is encrypted by the encryption module 218, modulated by the modulator 220 (typically using a QPSK modulation scheme), and provided to the transmitter 105, which broadcasts the modulated data stream on a frequency bandwidth to the satellite via the antenna 106. The receiver 500 at the receiver station 110 receives these signals, and using the SCID, reassembles the packets to regenerate the program material for each of the channels.

Figure 3B:
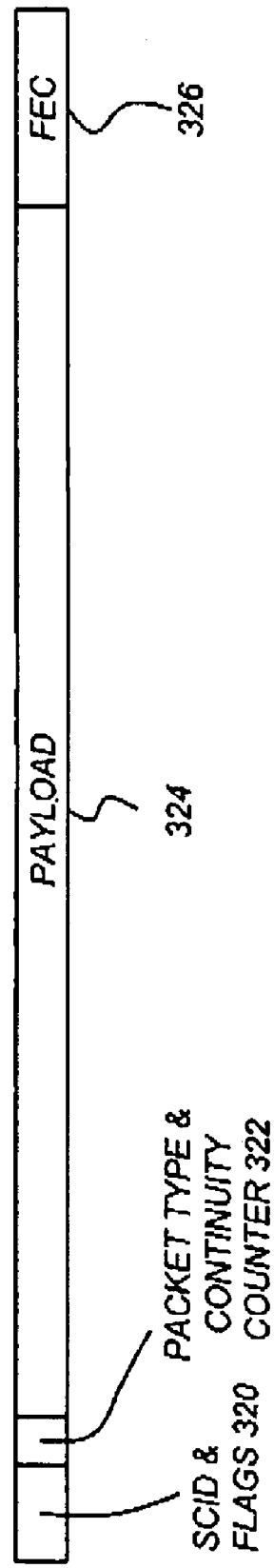
FIG. 3B is a diagram of a representative data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type generally identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
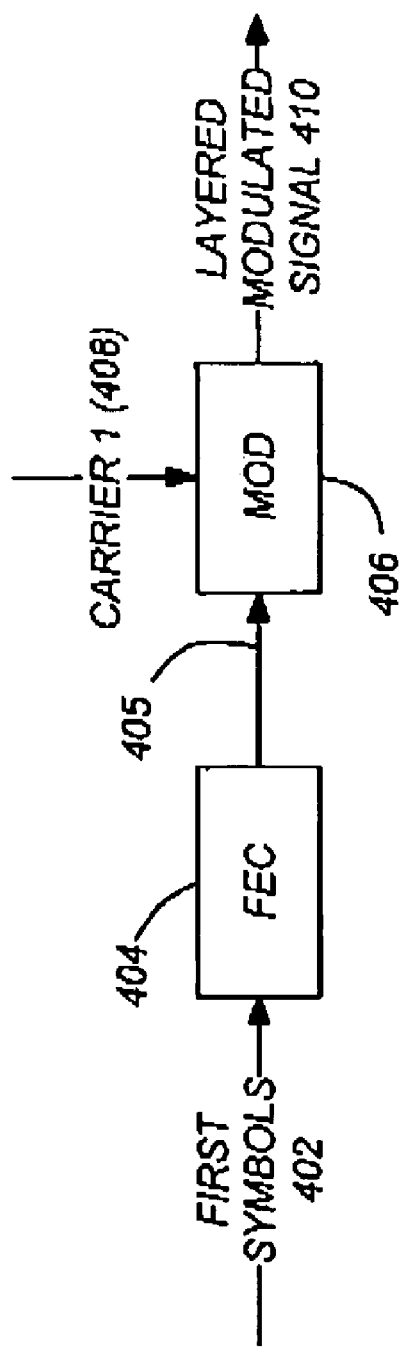
FIG. 4 is a block diagram showing one embodiment of the modulator.

FIG. 4 is a block diagram showing a typical modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce a modulated signal 410.

2.3 Integrated Receiver/Decoder

Figure 5:
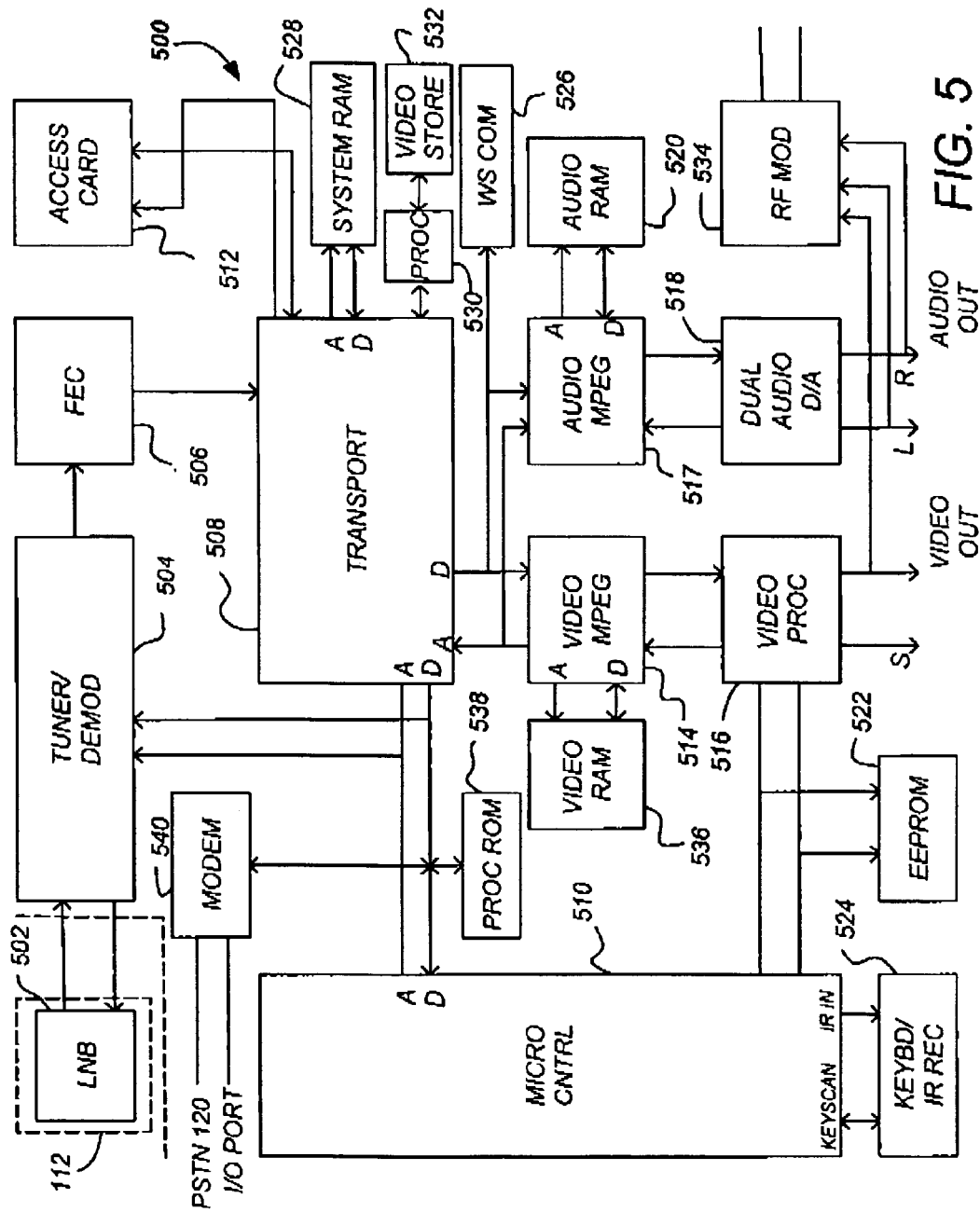
FIG. 5 is a block diagram of an integrated receiver/decoder.

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more low noise blocks (LNBs) 502. The LNB 502 converts the 12.2- to 12.7 GHz downlink 118 signal from the satellites 108 to, e.g., a 950-1450 MHz signal required by the IRD's 500 tuner/demodulator 504. Typically, the LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder signal, and converts the modulated data to a digital data stream. The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. As needed the transport module employs system RAM 528 to process the data. In one embodiment of the present invention, the transport module 508, video MPEG decoder 514 and audio MPEG decoder 517 are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the receiver 500 is permitted to access certain program material. Data from the transport module 508 can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a removable smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from a remote control, an IRD 500 keyboard interface, and/or other suitable input device 524. The microcontroller 510 receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

A typical video distribution system can also comprise a local storage unit such as the video storage device 532 for storing video and/or audio data obtained from the transport module 508. Video storage device 532 can be a hard disk drive, a read/writable compact disc of DVD, a solid state RAM, or any other suitable storage medium. Further, the video storage device 532 can comprise a hard disk drive with specialized parallel read/write capability so that data may be read from the video storage device 532 and written to the device 532 at the same time. To accomplish this, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. A single transponder operating at a single frequency band can carry a plurality of channels identified by respective service channel identification (SCID).

The IRD 500 can also receive and store a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

A video distribution system used with the invention can also provide the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver uses two demodulators and one remodulator (which can be combined in one or more processors). Such layered modulation systems are described in U.S. patent application Ser. No. 09/844,401, filed Apr. 27, 2001, by Ernest C. Chen, entitled "LAYERED MODULATION FOR DIGITAL SIGNALS," which is incorporated by reference herein.

In a typical backwards-compatible embodiment of the present invention, the legacy QPSK signal is boosted in power to a higher transmission (and reception) level. The legacy receiver will not be able to distinguish the new lower layer signal, from additive white Gaussian noise, and thus operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

4. Hardware Environment

Figure 6:
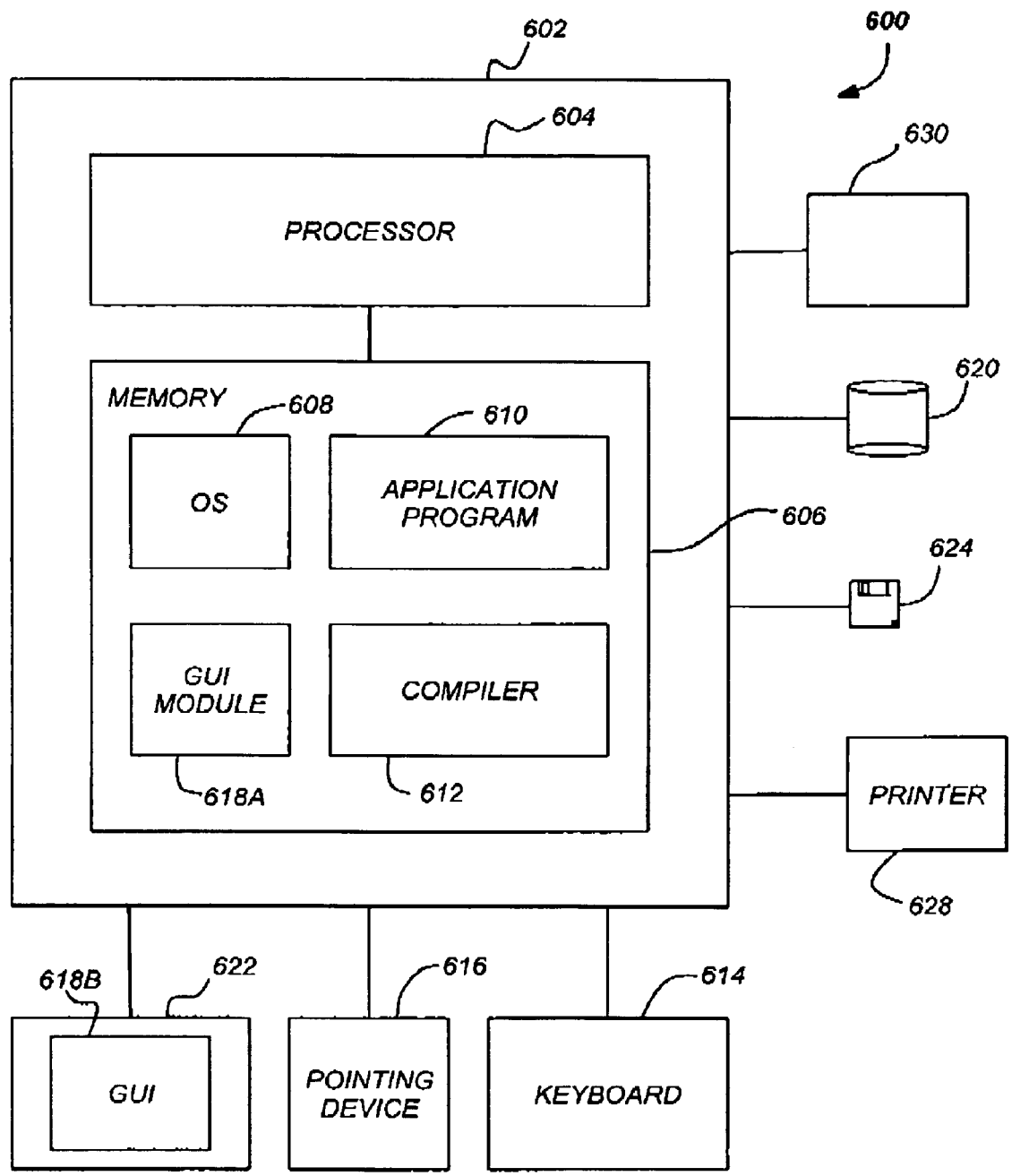
FIG. 6 illustrates an exemplary computer system that could be used to implement selected modules or functions the present invention.

FIG. 6 illustrates an exemplary computer system 600 that could be used to implement selected modules and/or functions of the present invention. The computer 602 comprises a processor 604 and a memory 606, such as random access memory (RAM). The computer 602 is operatively coupled to a display 622, which presents images such as windows to the user on a graphical user interface 618B. The computer 602 may be coupled to other devices, such as a keyboard 614, a mouse device 616, a printer, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618A is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the steps necessary to implement and/or use the present invention. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

5. On-line Phase Noise Measurement

Figure 7:
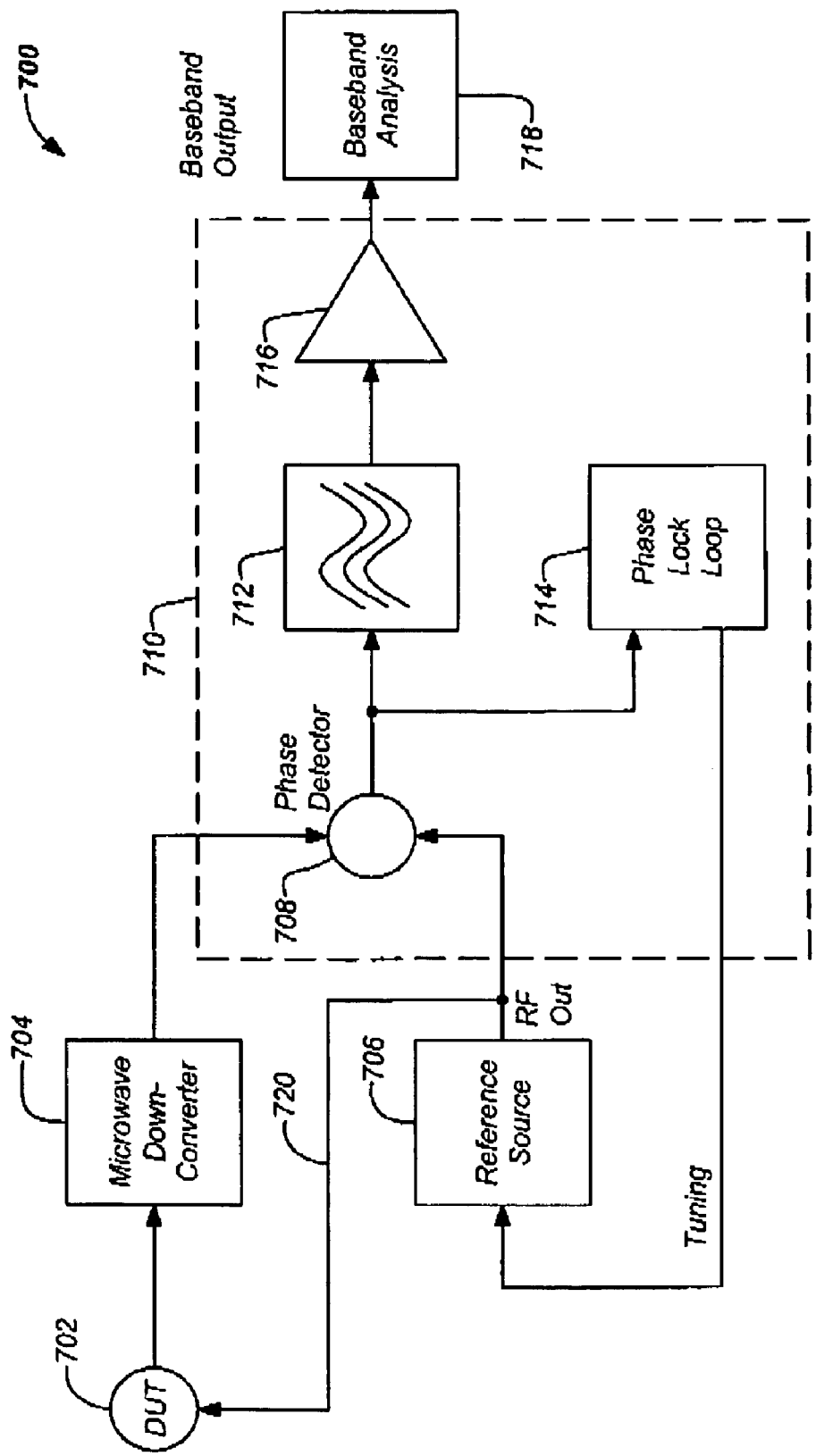
FIG. 7 is a block diagram of a conventional system for measuring phase noise.

FIG. 7 is a block diagram of a conventional apparatus 700 for measuring phase noise. The apparatus 700 includes a microwave down converter 704 coupled to the device under test (DUT) 702. Importantly, the DUT 702 is taken off line in order to be tested with a single-tone signal from a reference source 706. After down-converting the signal from the DUT 702, the signal is passed to a phase detector 708. The phase detector 708 compares the down-converted signal with an RF signal from a reference source 706. The RF signal from the reference source 706 is tuned from the output of the phase detector 708 by a phase lock loop (PLL) 714. The output of the phase detector 708 is also passed to a signal conditioner 712 and amplifier 716 before being coupled to a baseband analyzer 718. The base band analyzer 718 reveals the phase noise measurement of the DUT 702. The phase detector 708, PLL 714, signal conditioner 712 and amplifier 716 can all be facilitated by a single test set 710 (e.g. AGILENT E5500 Series Test Set).

If the DUT 702 comprises a device such as an LNB, an additional interface must be added to provide a wireless RF signal for input to the LNB front end (i.e. the LNB horn) as indicated by the input path 720 from the reference source 706. A Ku-band single-tone microwave source (e.g. from approximately 950 MHz to 1450 MHz) can be provided as the reference source 706 to the DUT 702. The reference source 706 should provide a clean signal in phase and thermal noise. The microwave down converter 704 and the reference source 706 operate to translate the signal from the LNB to the baseband. Accordingly, a clean down converter 704 and reference source 706 must be used. The phase detector measures the difference between the down converted LNB output and the reference signal phases. The PLL 714 tracks out the phase noise within the PLL bandwidth. The PLL bandwidth should be narrower than the smallest frequency of interest. Embodiments of the present invention are directed to an alternative to this conventional apparatus 700 for measuring phase noise off line.

Figure 8:
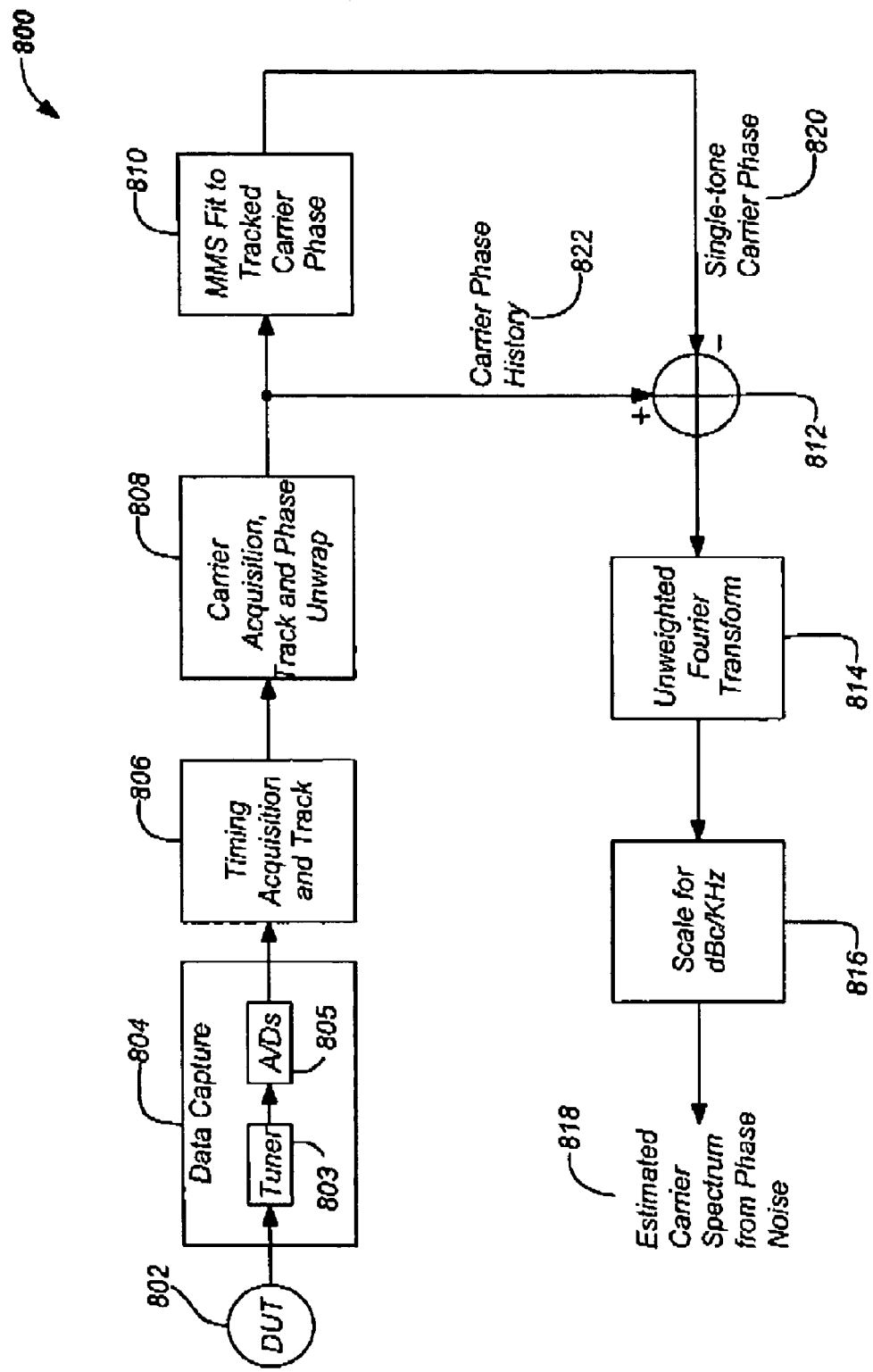
FIG. 8 is a block diagram of an exemplary apparatus of the invention for measuring phase noise.

FIG. 8 is a block diagram of an exemplary apparatus 800 of the invention for measuring phase noise on line. The apparatus 800 performs the phase noise measurement directly from captured on line payload data. First, a data segment is captured from the LNB 802 intermediate frequency (IF) signal in data capture system 804. For example, on the order of 16K symbols can be captured from the IF range of approximately 950 MHz to 1,450 MHz. The data capture system 804 comprises a tuner 803 and an analog-to-digital converters (ADCs) 805 for each of the in-phase (I) and quadrature (Q) components of the signal. The tuner of the data capture system 804 translates the IF signal to the baseband before the I/Q ADCs. The tuner 803 should have a phase noise specification such that any phase noise introduced by the tuner 803 should be insignificant compared with that of the DUT 802 over the frequency range of interest. The length of the captured data is determined by the lowest frequency of interest for the test, e.g. 1 KHz. In one exemplary embodiment, the tuner 803 has a bandwidth of 24 MHz and the ADCs each produce 12 bit data for the I and Q signal components at 50 MHz.

Conventional timing and carrier frequency acquisition and recovery procedures as is known in the art are applied to the captured baseband data in a timing processor 806 and a subsequent carrier processor 808. The timing processor 806 performs timing acquisition and provides timing-tracked data (e.g. floating point values of I and Q components at 20 MHz) to the carrier processor 808. The carrier processor 808 produces a tracked and unwrapped carrier phase history 822 from the timing-tracked data of the timing processor 806. Unwrapping the carrier phase history eliminates the effect of the ambiguity (or discontinuity) as the phase transitions between values of +180° to −180°. The carrier phase history 822 is then fitted with a straight line by a line fitting processor 810 and a linear phase 820 (also termed a single-tone carrier phase) is determined from the straight line. A minimum mean square (MMS) process can be used by the line fitting processor 810. The straight line represents the estimated residual frequency of the captured data, which might come from local oscillator (LO) frequency error of the LNB, tuner frequency error, Doppler effect, etc.

Residual phase is then obtained by subtracting the linear phase 820 from the received phase history 822. The residual phase mainly comprises two components, device phase noise and system thermal noise. The residual phase can further undergo spectral analysis by a fast Fourier transform (FFT) processor 814 to provide the spectrum of the phase noise on top of thermal noise (and any other errors). A scaling process 816 can be applied to the output of the FFT 814 to convert the magnitude of the output to dBc/KHz and provide the estimated carrier spectrum from phase noise 818.

Figure 9A:
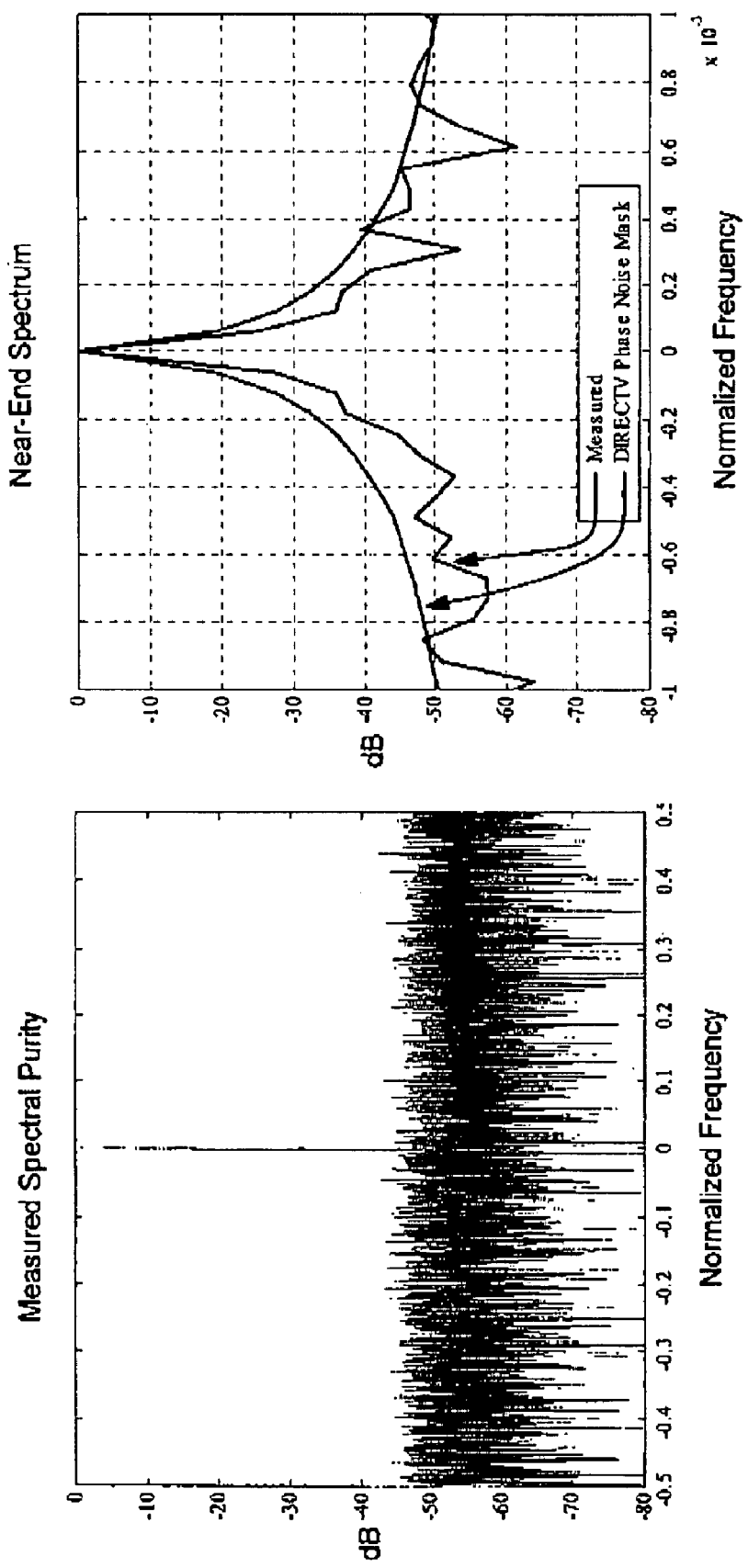
FIG. 9A is a first set of exemplary plots of measured spectral purity and near-end spectrum applying the invention.

FIG. 9A is a first set of exemplary plots of the spectrum of the tracked carrier history after applying the invention. The plots are of the measured spectral purity and the near-end spectrum from captured data of an on line DIRECTV signal. The resolution bandwidth is approximately 1.22 KHz with an FFT sample size of 16,384 and a sample frequency of 20 MHz. The estimated carrier to noise ratio in the captured data is approximately 10.5 dB. The peak to average ratio of the tracked carrier spectrum is approximately 52.3 dB on the left of FIG. 9A. The measured total phase noise (presumably mostly due to the LNB under test) is about 5 dB below the near-in phase noise specification. The near-in spectrum on the right of FIG. 9A is superimposed with the DIRECTV phase specification for the LNB.

Figure 9B:
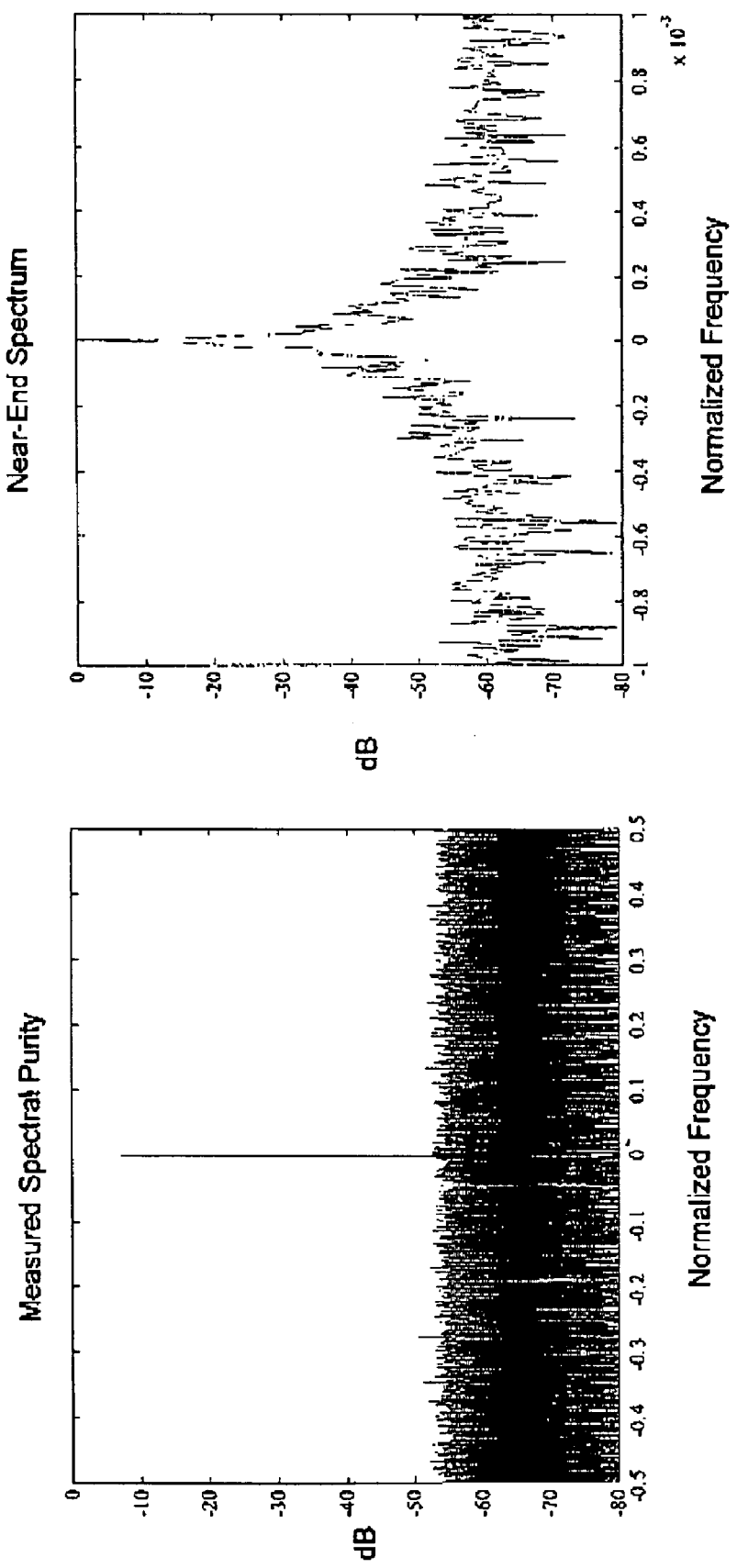
FIG. 9B is a second set of exemplary plots of measured spectral purity and near-end spectrum applying the invention.

FIG. 9B is a second set of exemplary plots of the spectrum of the tracked carrier history after applying the invention. This shows the measured carrier spectrum with a finer frequency resolution by processing over a longer data array as may be desired. The resolution bandwidth is reduced to 0.153 KHz with an FFT sample size increased to 131,072. The estimated carrier to noise ratio is approximately 10.6 dB. The peak to average ratio is approximately 61.3 dB. The spectrum is similar to that of FIG. 9A, however, the entire envelope is lowered by approximately 9 dB from a finer resolution ratio of 1.22 KHz/0.153 KHz/.

Figure 10:
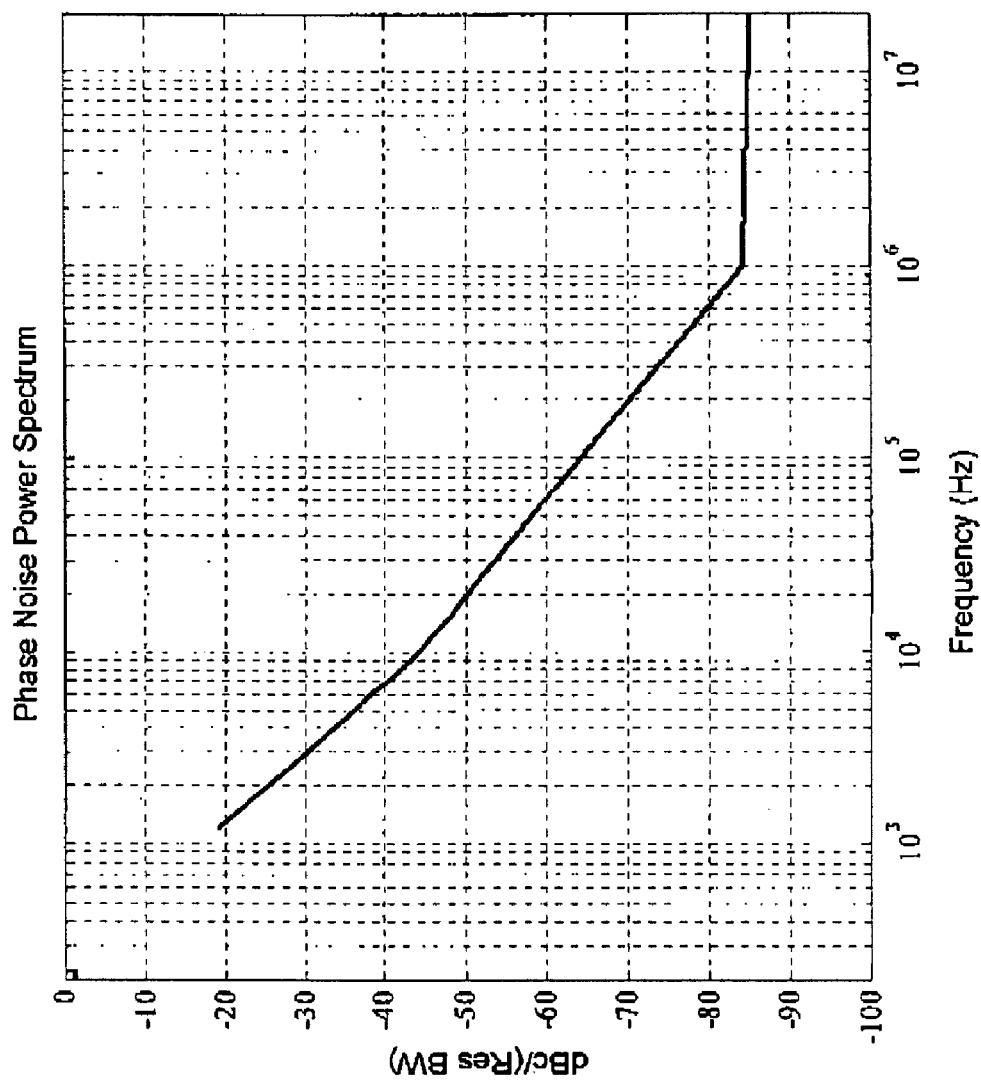
FIG. 10 is a plot of an exemplary LNB phase noise specification.

FIG. 10 is a plot of an exemplary LNB phase noise specification. The LNB specification is for a DIRECTV satellite television LNB. The phase noise power spectrum is symmetric about DC. The nominal carrier is translated to DC for simplicity. The resolution bandwidth is approximately 1.22 KHz.

Figure 11:
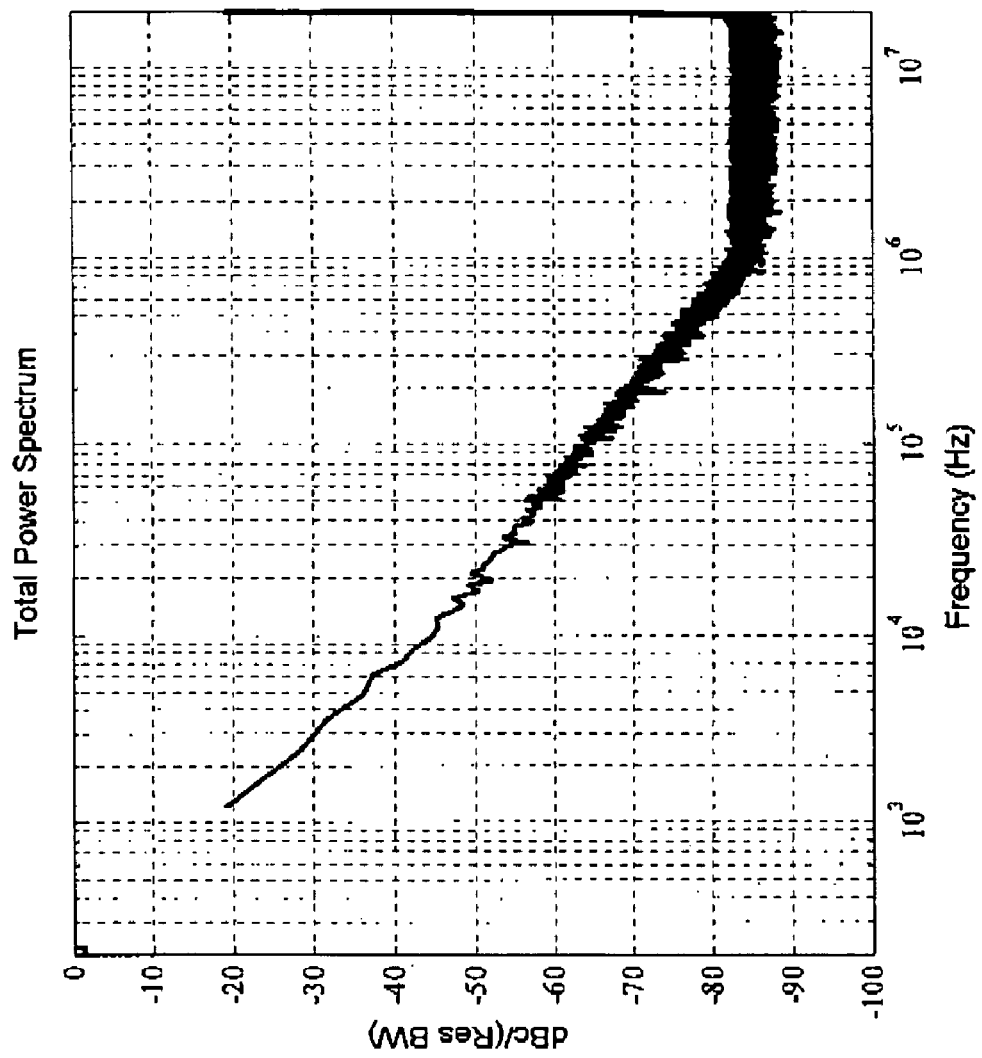
FIG. 11 is a plot of a spectrum of simulated phase noise with noise specification of FIG. 10.

FIG. 11 is a plot of a simulated signal spectrum. A simulation of the LNB phase noise can be performed in order to check the analytical result of the phase noise impact. In addition, the simulation can be used to compare and therefore validate the measured carrier spectrum from the capture data exemplified for this invention. The simulation procedure begins by simulating a carrier-less signal with QPSK or 8PSK modulation as desired. Next, a carrier with the phase noise characteristics is simulated and added to the signal.

For example, a carrier with phase noise such as that shown in FIG. 11 can be simulated by first generating a frequency-domain signal with a phase noise specification mask and then randomizing all phases over frequencies. To make phase conjugates symmetric with respect to positive frequencies, the output is replicated for negative frequency spectrum. Following this, an inverse FFT is performed to obtain the time domain signal. (Magnitude variations are only due to the phase conjugation.) Next, the magnitude variations are changed to phase variations (in radians) in the time domain. Finally, complex time arrays are formed from the result. The close resemblance of the simulated signal spectrum of FIG. 11 to the phase noise specification of FIG. 10 is evident.

The simulated carrier-less signal and the carrier with phase noise characteristics can then combined with complex number multiplications. The resulting signal is then demodulated and the phase spectrum extracted. The extracted phase spectrum can then be compared with the original phase noise spectrum to evaluate the process. Accordingly, the carrier can be modulated with a pseudo-random symbol sequence in phase noise and then subsequently demodulated to measure the introduced phase noise.

Figure 12:
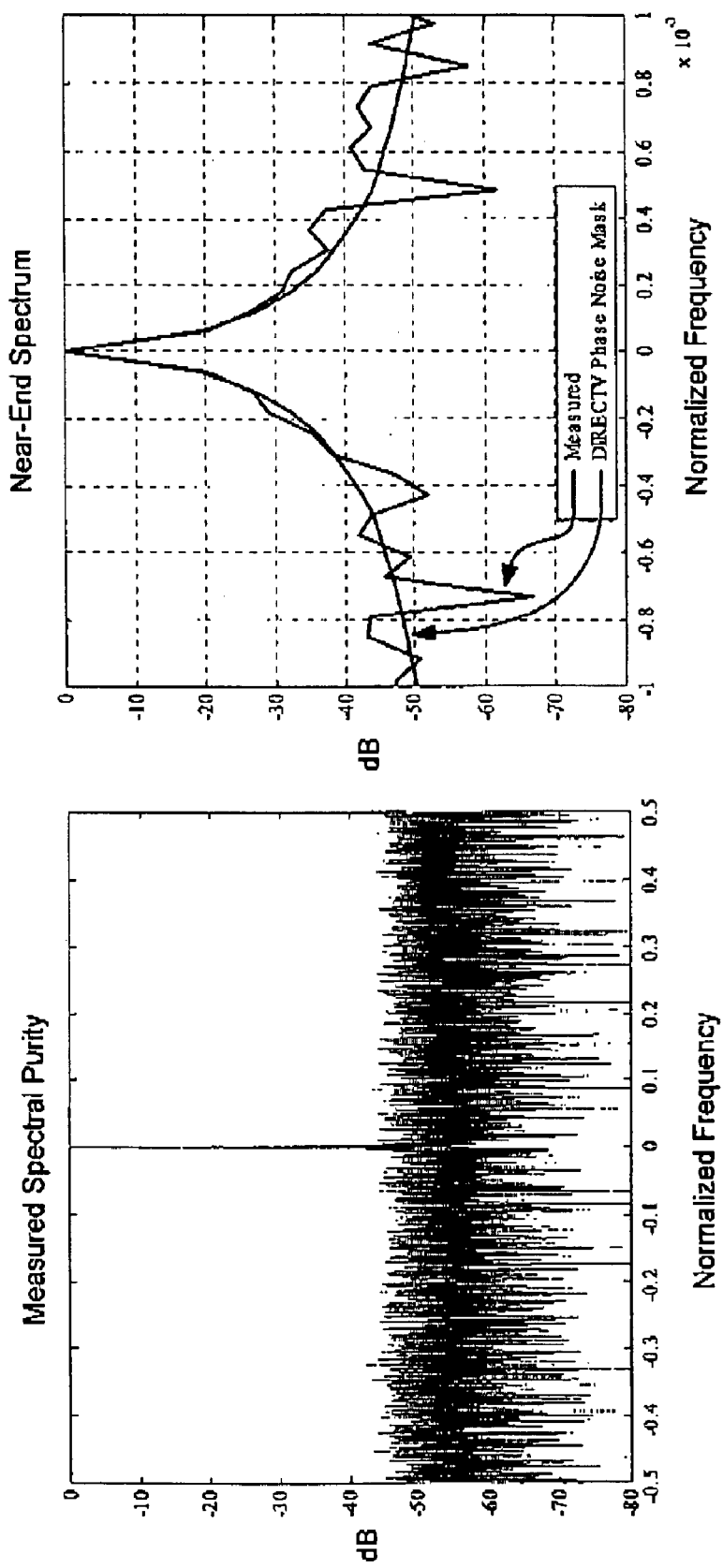
FIG. 12 is a plot of a output of the simulated signal in phase noise after modulation and demodulation.

FIG. 12 is a plot of phase noise spectrum measured from simulated QPSK signal in phase noise spectrum FIG. 11 after modulation and demodulation according to the foregoing simulation process. The resolution bandwidth is approximately 1.22 KHz and the simulated CNR is approximately 10 dB. A sample size of 16,384 is used. Shown on the right hand side of FIG. 12, the phase noise measured from the invention procedures closely matches the phase noise introduced in the test data. The phase noise above to the thermal noise floor of −49 dBc/1.22 KHz (for a CNR of 7 dB) can be measured, i.e., at up to ΔF of ±16 KHz for this example. The close match between the simulated signal spectrum and the LNB noise specification mask which the simulation built on validates the inventive procedure for phase noise measurement.

It should also be noted from the foregoing that since the calculated spectrum includes the thermal noise, the phase noise performance may be improved by using a larger antenna.

Figure 13:
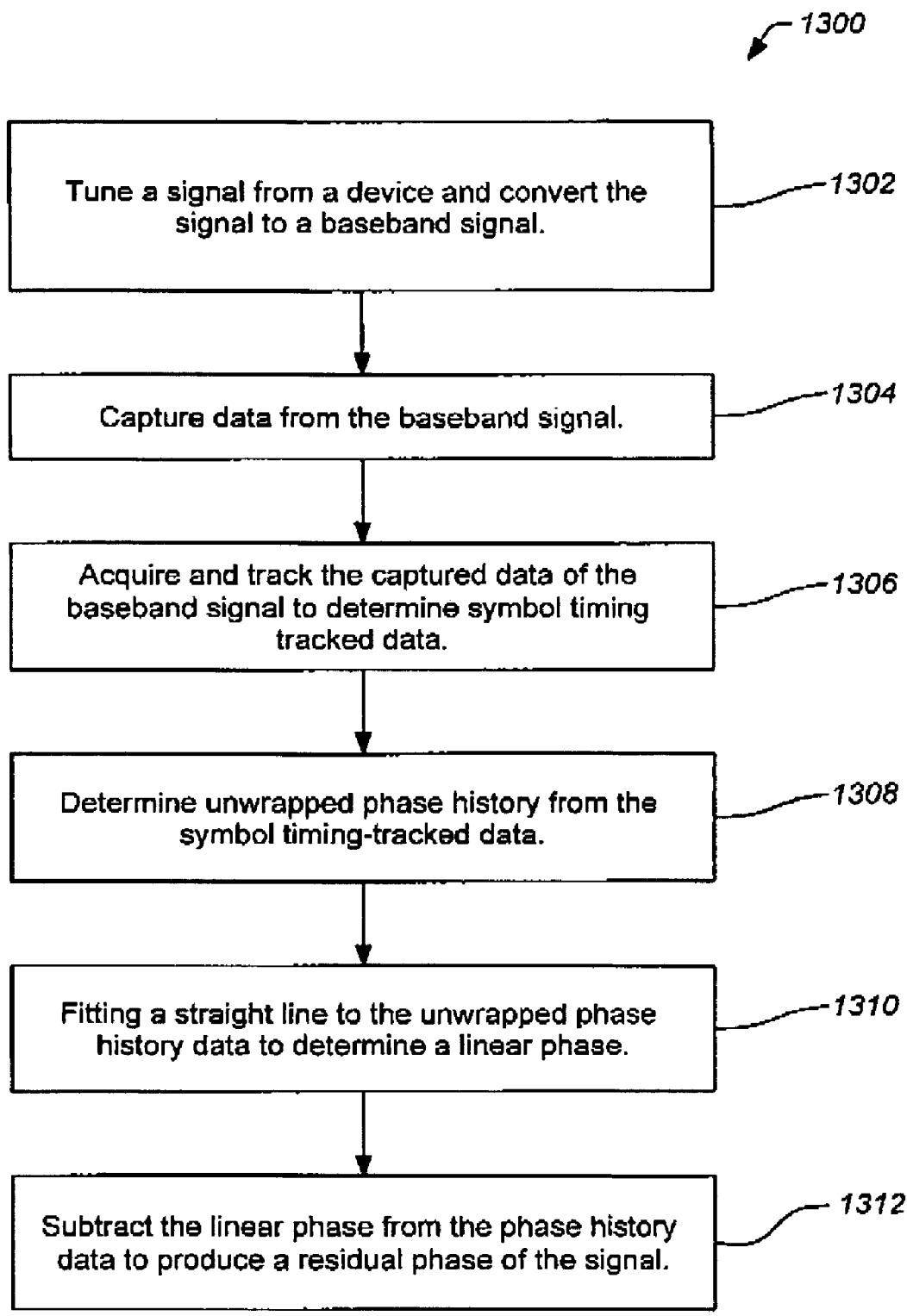
FIG. 13 is a flowchart of an exemplary method of the invention for measuring phase noise.

FIG. 13 is a flowchart of an exemplary method 1300 of the invention for measuring phase noise. At step 1302, a signal from a device is tuned and converted to a baseband signal. Next at step 1304, data from the baseband signal is captured. At step 1306, the captured data of the baseband signal is acquired and tracked to determine symbol timing tracked data. At step 1308, unwrapped phase history data is determined from the symbol timing tracked data. At step 1310, a straight line is fitted to the unwrapped phase history data to determine a linear phase. Finally at step 1312, the linear phase is subtracted from the phase history data to produce a residual phase of the signal. Further embodiment can comprise determining a phase noise spectrum from the residual phase with a fast Fourier transform (FFT) processor and scaling the power of the phase noise spectrum to dBc/KHz. The method 1300 can be further modified consistent with the apparatus described above.

This concludes the description including the preferred embodiments of the present invention. The foregoing has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for measuring phase noise, comprising:
a tuner for tuning a signal from a low-noise block converter (LNB) and converting the tuned signal to a baseband signal;
at least one analog-to-digital converter (ADC) for capturing data from the baseband signal;
a timing processor for acquiring and tracking symbol timing of the captured data of the baseband signal;
a carrier processor for determining unwrapped phase history data from the tracked symbol timing;
a line fitting processor for determining a linear phase by fitting a straight line to the unwrapped phase history data; and
a subtractor for subtracting the linear phase from the phase history data to produce a residual phase of the carrier, wherein the residual phase of the carrier is substantially a performance measurement of the LNB.

2. The system of claim 1, further comprising a fast Fourier transform (FFT) processor for determining a phase noise spectrum from the residual phase from the subtractor.

3. The system of claim 2, wherein the phase noise spectrum is scaled to dBc/KHz.

4. The system of claim 1, wherein the line fitting processor performs a minimum mean square (MMS) operation on the phase history data to determine the linear phase.

5. The system of claim 1, wherein the signal comprises a satellite television signal.

6. The system of claim 1, wherein the captured data comprises a length based upon a lowest frequency of interest.

7. The system of claim 1, comprising more than one ADC and wherein the captured data comprises in-phase (I) and quadrature (Q) components.

8. A method for measuring phase noise, comprising the steps of:
- tuning a signal from a low noise block converter (LNB) and converting the signal to a baseband signal;
- capturing data from the baseband signal;
- acquiring and tracking the captured data of the baseband signal to determine symbol timing tracked data;
- determining unwrapped phase history from the symbol timing tracked data;
- fitting a straight line to the unwrapped phase history data to determine a linear phase; and
- subtracting the linear phase from the phase history data to produce a residual phase of the signal, wherein the residual phase is substantially a performance measurement of the LNB.

9. The method of claim 8, further comprising determining a phase noise spectrum from the residual phase with a fast Fourier transform (FFT) processor.

10. The method of claim 9, further comprising scaling the phase noise spectrum to dBc/KHz.

11. The method of claim 8, wherein fitting the straight line comprises performing a minimum mean square (MMS) operation on the phase history data to determine the linear phase.

12. The method of claim 8, wherein the signal comprises a satellite television signal.

13. The method of claim 8, wherein the captured data comprises a length based upon a lowest frequency of interest.

14. The method of claim 8, comprising more than one ADC and wherein the captured data comprises in-phase (I) and quadrature (Q) components.

15. A system for measuring phase noise, comprising:
- means for tuning a signal from a low noise block converter (LNB) and converting the signal to a baseband signal;
- means for capturing data from the baseband signal;
- means for acquiring and tracking symbol dining of the captured data of the baseband signal;
- means for determining unwrapped phase history data from the tracked symbol timing;
- means for determining a linear phase by fitting a straight line to the unwrapped phase history data; and
- means for subtracting the linear phase from the phase history data to produce a residual phase of the signal, wherein the residual phase is substantially a performance measurement of the LNB.

16. The system of claim 15, further comprising means for determining a phase noise spectrum from the residual phase with a fast Fourier transform (FFT) processor.

17. The system of claim 16, further comprising means for scaling the phase noise spectrum to dBc/KHz.

18. The system of claim 15, wherein the means for fitting the straight line comprises means for performing a minimum mean square (MMS) operation on the phase history data to determine the linear phase.

19. The system of claim 15, wherein the signal comprises a satellite television signal.

20. The system of claim 15, wherein the captured data comprises a length based upon a lowest frequency of interest.

21. The system of claim 15, comprising more than one ADC and wherein the captured data comprises in-phase (I) and quadrature (Q) components.

* * * * *